Dec. 5, 1939.   H. W. JONKHOFF   2,182,437
STEERABLE BOGIE FOR VEHICLES
Filed Aug. 31, 1938   3 Sheets-Sheet 1

INVENTOR
H. W. JONKHOFF
By Wollhauster & Groff
Attys

Dec. 5, 1939.  H. W. JONKHOFF  2,182,437
STEERABLE BOGIE FOR VEHICLES
Filed Aug. 31, 1938  3 Sheets-Sheet 2

INVENTOR
H. W. JONKHOFF

Dec. 5, 1939.        H. W. JONKHOFF        2,182,437
STEERABLE BOGIE FOR VEHICLES
Filed Aug. 31, 1938        3 Sheets-Sheet 3
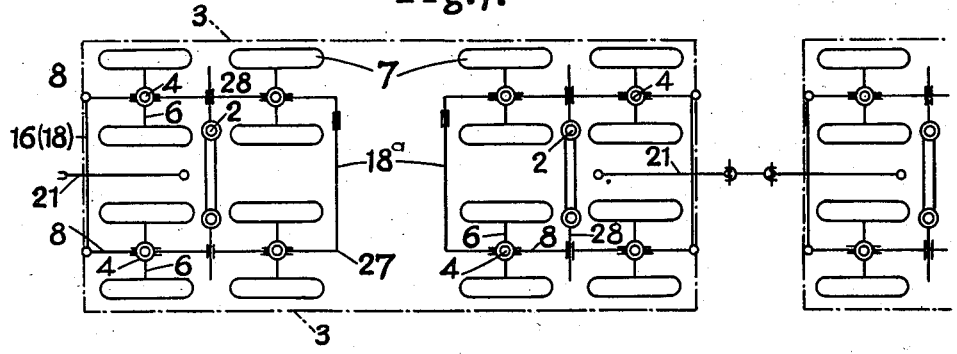
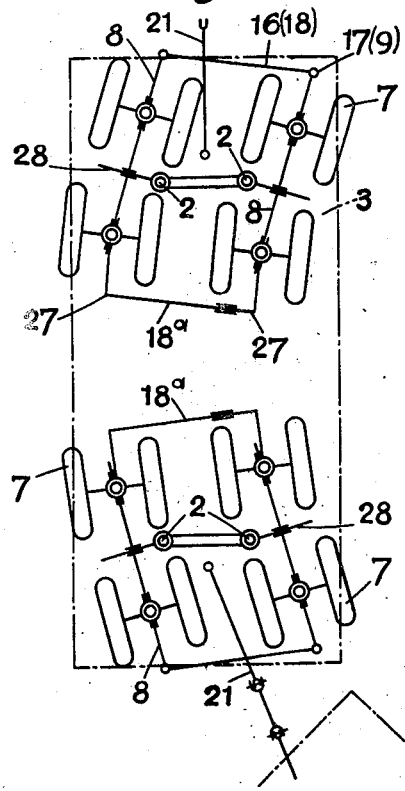
INVENTOR
H. W. JONKHOFF Patented Dec. 5, 1939

2,182,437

UNITED STATES PATENT OFFICE 2,182,437

STEERABLE BOGIE FOR VEHICLES

Henri Wouter Jonkhoff, Arnhem, Netherlands

Application August 31, 1938, Serial No. 227,840
In Great Britain September 21, 1937

7 Claims. (Cl. 280—33.5)

Multi-wheeled vehicles are known wherein the vehicle chassis is supported on a plurality of doubled wheeled bogies. The wheels of the bogies were mounted side by side on a wheel carrying arm by means of a parallel link suspension whereby the wheels were free to move vertically relatively to each other; at the same time, due to the mounting of the parallelogram structure about a vertical pivot pin, the wheels were capable of being rotated in a horizontal plane relative to the wheel carrying arm for steering purposes.

Such bogie constructions involve a considerable number of pivots, and the object of the present invention is to achieve a steerable bogie construction which is simpler and wherein the number of pivotal parts is reduced and steering movement is provided for the wheels by a single ball or other like universal joint which allows also of sufficient rocking movement to give substantially the equivalent of the relative vertical motion of the wheels in the prior construction.

According to the invention there is provided a steerable bogie which includes a longitudinal rocking member mounted on the main bogie body which swivels about a king pin. On the said rocking member there is carried one or two steerable wheel assemblies each of which comprises essentially a cross member connected at the intersection of its arms to one end of the rocking member by a suitable universal joint (e. g., a ball joint); the lateral arms of the cross each carry a road wheel, and the longitudinal arm serves as a means for steering the assembly.

In order that the invention may be readily understood and carried into effect, reference will now be made to the accompanying drawings, wherein.

Figure 1:
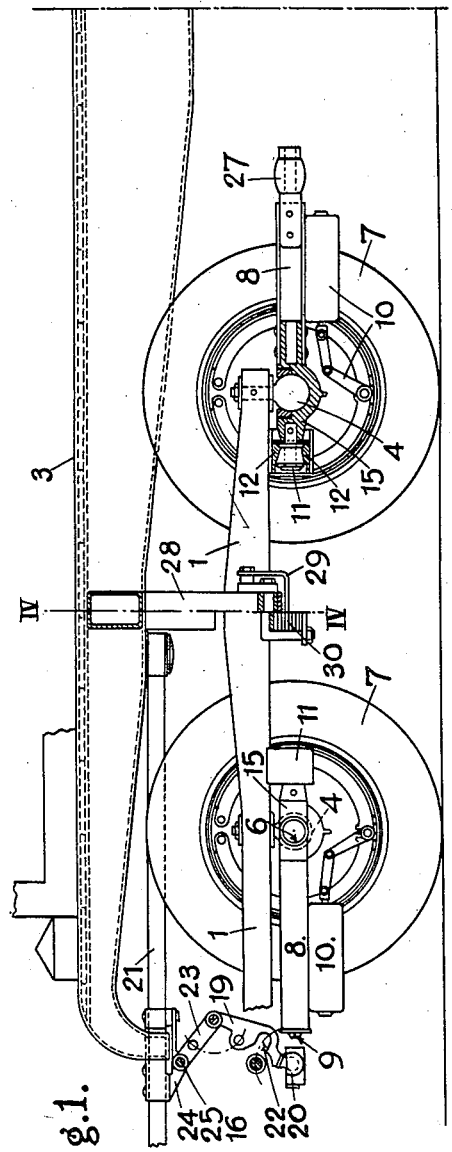
Figure 1 is a side elevation of one embodiment of a four wheeled bogie according to the invention forming one of a pair of such bogies arranged side by side and supporting one end of the vehicle chassis.
Figure 5:
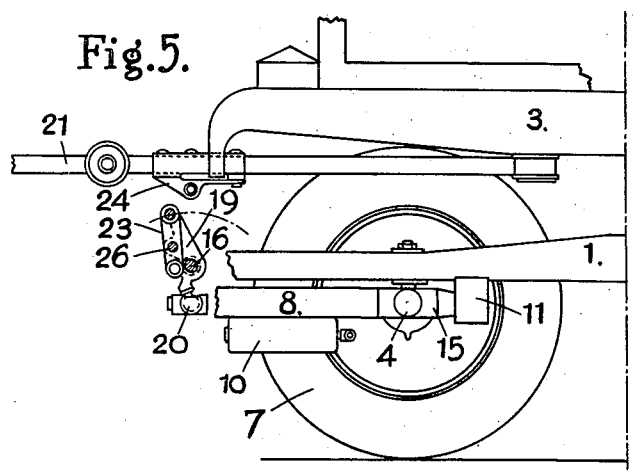
Figure 6:
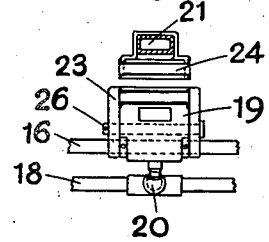

Figure 5 reproduces a portion of Figure 1, but shows the coupling member which is pivotally mounted on the transverse rod interconnecting the steering arms of the respective bogies, coupling the said rod to the rod which interconnects the longitudinal rocking members;

Figure 6 is a detail in front elevation of the coupling in the position of Figure 5;

Figure 7 is a diagrammatic view of the arrangement of the bogies at each end of the vehicle chassis; and Figure 8 is a similar view to Figure 7, but shows the disposition of the bogies when the vehicle is negotiating a curve.

Each bogie includes a longitudinal member 1 which is mounted for rocking movement on the bogie body, preferably in manner to be described, the body swivelling about a king pin 2, which is mounted underneath the vehicle platform or chassis 3. A steerable wheel assembly is carried at one or each end of the longitudinal rocking member 1—in the embodiment shown there are two wheel assemblies forming a four wheeled bogie—the connection between each assembly and the member 1 consisting of a single ball joint 4 which allows for swivelling movement as well as lateral rocking movement of the wheel assembly in relation to the longitudinal member 1. Each wheel assembly consists of a cross member 5 which at the point of intersection of its arms, is connected by the ball joint 4 to the longitudinal rocking member 1. At the ends of the lateral arms 6 of the cross member are mounted the road wheels 7, whilst the longitudinal arm 8 of the cross member constitutes a steering arm for swivelling the wheel assembly in relation to the longitudinal rocking member 1.

It will be noted that the centre of the ball joint 4 is preferably disposed in the same horizontal plane as the axis of the wheels 7 and in line with a flexible coupling in the form of a ball joint 9 to be hereinafter referred to, at the end of the steering arm 8 of the bogie. This preferred arrangement can be seen clearly in Figure 1.

The wheel assembly just described is thus a unit which has universal movement in relation to the longitudinal rocking member 1 of the bogie, and which may include as shown braking means 10 for the wheels as well as means for driving the wheels and other devices as may be necessary.

For the purpose of keeping the longitudinal axis of the cross member 5 and thereby of the wheel assembly in a plane parallel to the rocking member 1 there is provided a guide 11 carried by the latter member 1. In the drawings, and with particular reference to Figures 1 and 2, the guide consists of a casing in which upper and lower arcuate bearing surfaces 12 are mounted, these surfaces tapering to form a conical bearing wherein a conical roller 13 can just move. This roller is rotatable on the axle 14 projecting from a fourth arm 15 of the cross member 5 in line with the axis of the ball joint 4. Thus the member 5 can rock and swivel without interference, whilst the plane of its longitudinal axis is at all times kept parallel with that of the rocking member 1. This guide also serves to stabilise the ball joint 9 at the end of the steering arm 8 of the cross member so that it is not affected by the rocking of the wheel assembly.

Figure 3:
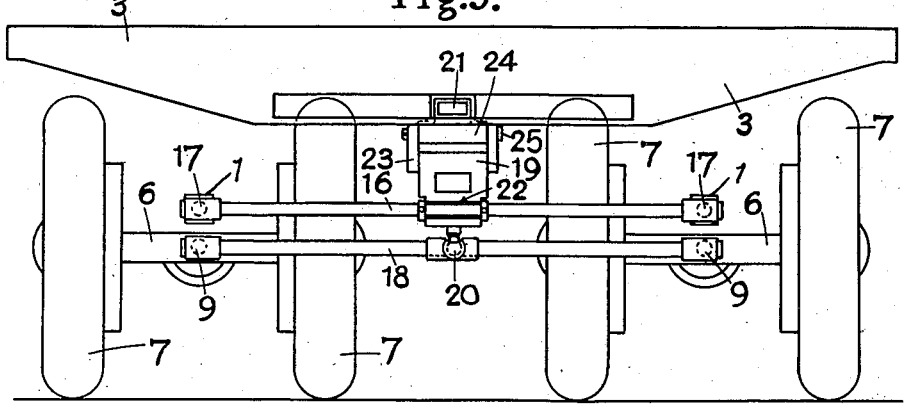
Figure 3 is a front view of the bogie with certain parts omitted for clearness; the view shows particularly the transverse rods which connect the steering arms and the longitudinal rocking arms of the respective bogies.

In Figure 3 two bogies are arranged side by side, and the two longitudinal rocking members 1 thereof are interconnected by a transverse rod 16 the ends of which are coupled to the said members 1 by ball joints 17. This connection serves to keep the two rocking members 1 parallel to each other in the straight forward position. The outer wheel assemblies of the two bogies are also coupled together by a transverse rod 18 which by means of the ball joints 9 previously referred to is connected to the outer ends of the steering arms 8. There is also provided a directing coupling 19 which is connected to the centre of the transverse rod 18 by means of a ball joint 20, and is used for connecting the rod 18 to the draw bar 21 of the vehicle, or to the rod 16 according to the direction in which the vehicle is travelling so that the vehicle can be steered in either direction as will hereinafter appear. The main arm of this coupling has a slot 22 which can embrace the rod 16 and be locked thereto by means of the articulated arms 23. To lock the coupling to the draw bar, the arms 23 are swung up as shown in Figure 1 until they embrace a lug 24 on the draw bar—the slot 22 being then free of the rod 16—and a pin 25 is passed through the arms 23 and the lug 24. To lock the rods 16 and 18 together, the pin 25 is withdrawn, and the arms 23 swung down to bring the slot 22 around the rod 16, and a pin 26 is passed through the arms 23 and the main arm of the coupling as will readily be appreciated from Figures 5 and 6. It will be understood that the coupling herein described is only an example; other constructions to give the desired results may be employed.

Figure 2:
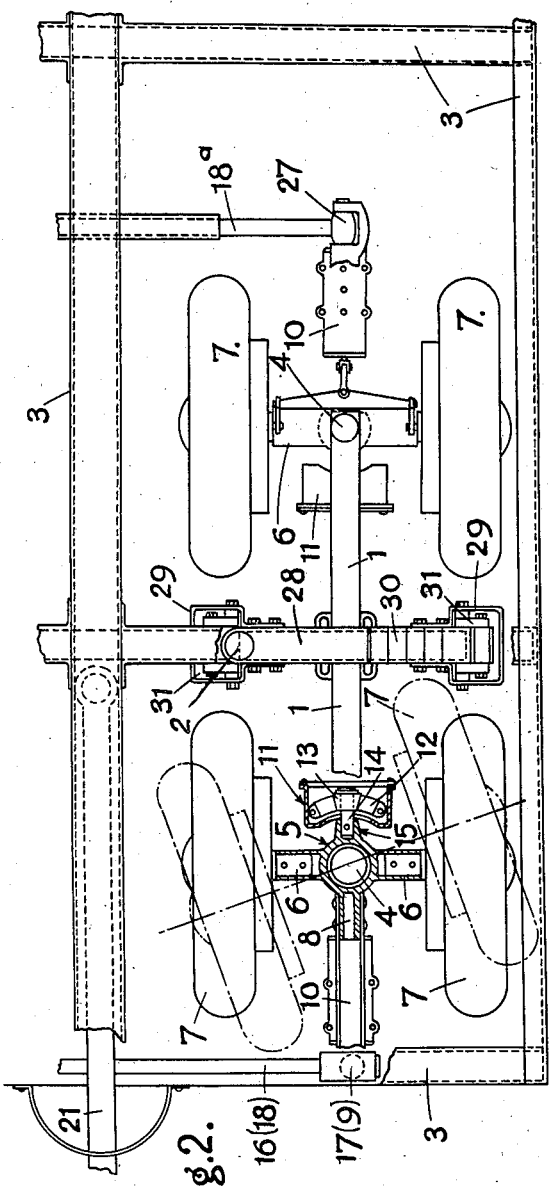
Figure 2 is a plan of the bogie shown in Figure 1.

As previously mentioned, in the embodiment shown each longitudinal rocking member 1 carries two wheel assemblies, one at each of its ends. Both assemblies are similar in construction, but the inner one, that is the one on the right of Figures 1 and 2 is steered automatically. The inner wheel assemblies of the side by side arranged bogies, have their longitudinal steering arms 8 connected by a transverse rod 18ᵃ, but the joints between the latter and the arms 8 are simple pivotal ones 27 providing only for rocking movement of these assemblies about their ball joints 4. Thus the steering arms 8 thereof and the interconnecting rod 18ᵃ always form a U.

The transverse steering rods 18ᵃ interconnecting the steering arms 8 of the wheel assemblies may have provision for adjustment as to length. Thus they may consist of two telescoping parts, as illustrated on the right of Figure 2, so that the distance between the ends of the steering arms 8 of two side by side bogies may vary as the vehicle negotiates a curve, it being noted that the length of the respective rods 16 connecting the longitudinal rocking members 1 is invariable.

Figure 4:
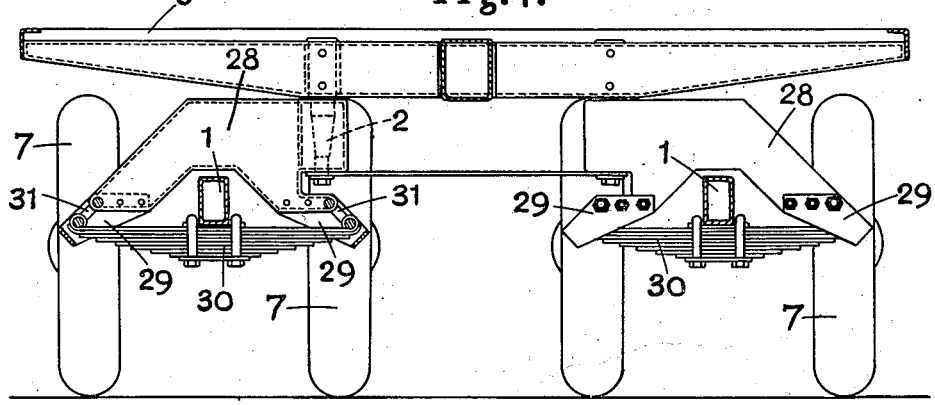
Figure 4 is a transverse section on the line IV—IV of Figure 1, and serves to show the method of rockably mounting the longitudinal rocking members of the bogies.

One feature of the steerable wheel bogie construction according to the invention is the method employed for rockably mounting the longitudinal member 1. In Figure 4 particularly, it will be seen that the inverted U-shape bogie body 28 which swivels about the king pin 2, has a box member 29 fixed at the end of each arm. The longitudinal member 1 passes through the bogie body and is supported by a laminated spring 30 which has its ends slidably mounted between the vertical sides of the boxes 29. Conveniently this slidable connection takes the form of links 31 connecting the spring ends to the bogie body. With this arrangement the spring ends are kept from being displaced longitudinally so that tractive power can be transmitted between the bogie and the vehicle chassis. At the same time, the springs 30 serve to resiliently support the bogie body upon the members 1 and are sufficiently yieldable torsionally to permit all required rocking movements of the members 1.

A vehicle according to the invention may have as many of the improved steerable bogies as may be desired. In the drawings, and with particular reference to Figures 7 and 8, a vehicle chassis is supported at each end by a pair of four wheeled bogies, the bogies of each pair being arranged side by side. The vehicle is steerable in either direction by means of the outer wheel assemblies, whilst the inner wheel assemblies, are automatically steered, being turned as the vehicle negotiates a curve as will be understood by reference to Figure 8. The inner wheel assemblies are those which have the simple pivotal joints 27.

When the vehicle is travelling in one direction, the directing coupling 19 at the forward end of the vehicle will be arranged to connect the transverse steering rod 18 to the draw bar 21 in the manner previously described, whilst the directing coupling at the rear end of the vehicle will connect together the two rods 18 and 16 of the outer wheel assemblies of the pair of bogies at that end. Thus the front end outer wheel assemblies will follow the swivelling movements of the draw bar when the vehicle is negotiating a curve; the two inner pairs of wheel assemblies will be steered automatically as they follow the curve taken by the vehicle; and the rear end outer wheel assemblies being coupled to the transverse rod interconnecting their longitudinal rocking members 1, are kept parallel with and move with the swivelling movements of their bogie bodies. When the vehicle is being drawn in the opposite direction the directing couplings will be changed over; the previous forward wheels will become the rear wheels and the directing coupling 19 thereof will be arranged to connect them to their transverse rod 16 interconnecting their longitudinal rocking members 1; the previous rear wheels become the forward wheels which will be steerable by changing over their directing coupling 19 to connect them to the draw bar. The manner in which the various wheels move or whichever direction the vehicle is travelling will be understood by reference to Figure 8 without further description.

I claim:

1. A vehicle comprising a frame, a pair of beams disposed longitudinally with respect to said frame and pivotally mounted intermediate their ends upon said frame for independent substantially horizontal swiveling movements, at least one wheel mounted on each beam forwardly of its pivotal connection with the frame and at least one wheel mounted on each beam rearwardly of its pivotal connection with the frame, corresponding wheels of the respective beams constituting pairs, pivotal connections between said wheels and said beams permitting angular steering movements of said wheels relative to said beams, means for effecting angular steering movements of one pair of said wheels relative to said beams, means connecting said beams requiring them to partake of unitary swiveling movements relative to said frame, and means connecting the other pair of said wheels maintaining them parallel to each other regardless of swiveling movements of said beams.

2. A vehicle comprising a frame, a pair of beams disposed longitudinally with respect to said frame and pivotally mounted intermediate their ends upon said frame for independent substantially horizontal swiveling movements, at least one wheel mounted on each beam forwardly of its pivotal connection with the frame and at least one wheel mounted on each beam rearwardly of its pivotal connection with the frame, corresponding wheels of the respective beams constituting pairs, pivotal connections between said wheels and said beams permitting angular steering movements of said wheels relative to said beams, means for effecting angular steering movements of one pair of said wheels relative to said beams, means connecting said beams requiring them to partake of unitary swiveling movements relative to said frame, and a telescopic cross-member connection between the other pair of said wheels maintaining them parallel to each other regardless of swiveling movements of said beams.

3. A vehicle as set forth in claim 1 including means mounting the beams on the frame for longitudinal rocking movements relative to said frame.

4. A vehicle as set forth in claim 1 including spring suspension means between the beams and the frame permitting vertical movements of the frame relative to the beams and longitudinal rocking movements of the beams relative to the frame.

5. A vehicle comprising a frame, a pair of beams disposed longitudinally with respect to said frame and pivotally mounted intermediate their ends upon said frame for independent substantially horizontal swiveling movements, a pair of wheels mounted on each beam forwardly of its pivotal connection with the frame and a pair of wheels mounted on each beam rearwardly of its pivotal connection with the frame, the wheels of each pair being disposed respectively to opposite sides of the related beam, a pivotal connection between each pair of wheels and their related beam permitting angular steering movements of the pairs of wheels relative to said beams, means for effecting angular steering movements of one corresponding pair of said pairs of wheels relative to said beams, means connecting said beams requiring them to partake of unitary swiveling movements relative to said frame, and means connecting the other corresponding pair of said pairs of wheels and maintaining them parallel to each other regardless of swiveling movements of said beams.

6. A vehicle as set forth in claim 5 in which the pivotal connections between the respective pairs of wheels and the beams are of the universal type permitting universal pivotal movements of the pairs of wheels relative to the beams.

7. A vehicle comprising a frame, a first pair of beams disposed longitudinally with respect to said frame and pivotally mounted intermediate their ends upon said frame for independent substantially horizontal swiveling movements, a second pair of beams disposed longitudinally with respect to said frame and pivotally mounted intermediate their ends upon said frame for independent substantially horizontal swiveling movements, said pairs of beams being spaced apart longitudinally relative to said frame, at least one wheel mounted on each beam forwardly of its pivotal connection with the frame and at least one wheel mounted on each beam rearwardly of its pivotal connection with the frame, corresponding wheels of the respective beams constituting pairs, pivotal connections between said wheels and said beams permitting angular steering movements of said wheels relative to said beams, means for effecting angular steering movements of one pair of the wheels of one pair of the beams relative to their beams, means connecting the other pair of wheels of the same beams and maintaining them constantly parallel to each other, means connecting the beams of each pair and requiring them to partake of unitary swiveling movements, means for locking one pair of wheels of the other pair of beams against angular steering movements relative to their beams, and means connecting the other pair of wheels of the last mentioned pair of beams and maintaining them parallel to each other regardless of swiveling movements of said last mentioned pair of beams.

HENRI WOUTER JONKHOFF.